United States Patent
Kang et al.

(10) Patent No.: US 7,063,457 B2
(45) Date of Patent: Jun. 20, 2006

(54) FIXED POINT CELL FOR CONNECTION WITH THE THERMOMETER PROTECTING TUBE AND APPARATUS FOR ESTIMATING THE LIFETIME OF THERMOMETER USING THE SAME

(75) Inventors: Kee Hoon Kang, Daejeon-Si (KR); Chang Ho Song, Daejeon-Si (KR); Yong Gyoo Kim, Daejeon-Si (KR); Kee Sool Gam, Chungcheongnam-do (KR); Young Hee Lee, Daejeon-si (KR)

(73) Assignee: Korea Research Institute of Standards and Science, Daejeon-Si (KR)

( * ) Notice: Subject to any disclaimer, the term of this patent is extended or adjusted under 35 U.S.C. 154(b) by 15 days.

(21) Appl. No.: 10/920,081

(22) Filed: Aug. 17, 2004

(65) Prior Publication Data

US 2005/0053114 A1 Mar. 10, 2005

(30) Foreign Application Priority Data

Sep. 4, 2003 (KR) ........................ 10-2003-0061928

(51) Int. Cl.
*G01K 15/00* (2006.01)
(52) U.S. Cl. .............................................. 374/3; 374/1
(58) Field of Classification Search .................... 374/1, 374/3
See application file for complete search history.

(56) References Cited

U.S. PATENT DOCUMENTS 6,641,299 B1 * 11/2003 Sasajima et al. ............... 374/2

FOREIGN PATENT DOCUMENTS

| DE | 19532077 A1 | * | 3/1997 |
|----|-------------|---|--------|
| DE | 19941731 A1 | * | 3/2001 |
| FR | 2590981 A1 | * | 6/1987 |
| GB | 2223100 A | * | 3/1990 |
| JP | 57088330 A | * | 6/1982 |
| JP | 61209346 A | * | 9/1986 |
| JP | 05133917 A | * | 5/1993 |

(Continued)

OTHER PUBLICATIONS

Megharfi et al., "Realization of Open Copper Fixed-Point Cells for Thermocouple Calibration", AIP-Conference Proceedings (USA), No. 684, Pt. 1, pp. 255–259, 2003.*

(Continued)

*Primary Examiner*—Diego Gutierrez
*Assistant Examiner*—Mirellys Jagan
(74) *Attorney, Agent, or Firm*—Vidas, Arrett & Steinkraus, P.A.

(57) ABSTRACT

A fixed-point cell for connection with a thermometer protecting tube and apparatus for estimating the lifetime of thermometer in the thermometer protecting tube including: a reference temperature material layer made of high-purity metallic materials to indicate a reference temperature based on a phase change of material, which coexists in a two-phase or three-phase state; a container part of a multiple structure having the reference temperature material layer embedded and sealed therein for achieving thermal correlation between the reference temperature material layer and the thermometer protecting tube having a thermometer contained therein, the thermometer protecting tube being inserted into the central hole of the fixed-point cell while being in contact with the inner circumference of the container part; and fixing devices disposed on the top portion of the container part for fixing the thermometer protecting tube to the container part in a fastening manner.

8 Claims, 4 Drawing Sheets

FOREIGN PATENT DOCUMENTS

SU          1700395 A1 * 12/1991

OTHER PUBLICATIONS

Edler et al., "A cobalt-carbon eutectic fixed point for the calibration of contact thermometers at temperatures above 1100 C", Metrologia (UK), vol. 42, No. 4, pp. 201-207, Apr. 26, 2005.*

Mangum et al., "Comparisons of some NIST fixed-point cells with similar cells of other standard laboratories", Metrologia, vol. 33, No. 3, pp. 215-225, 1996.*

Article: Small Fixed-Point Cells For Use In Dry Well Block Calibrators G. F. Strouse—Proceedings 8th International Symposium on Temperature and Thermal Measurements in Industry and Science, pp. 783-788, Jun. 19-21, 2001, Berlin, Germany.

* cited by examiner

FIXED POINT CELL FOR CONNECTION WITH THE THERMOMETER PROTECTING TUBE AND APPARATUS FOR ESTIMATING THE LIFETIME OF THERMOMETER USING THE SAME

BACKGROUND OF THE INVENTION

1. Field of the Invention

The present invention relates to an apparatus for estimating the lifetime of an industrial thermometer, and more particularly, to a fixed-point cell for connection with thermometer protecting tube and an apparatus for estimating the lifetime of the thermometer using the same, which can detect measurement error of the thermometer using constant-temperature property of a metallic material in an area where two phases or three phases coexist, and determine the replacement time of the thermometer.

2. Background of the Related Art

In general, an industrial thermometer refers to an instrument which is inserted into a thermometer protecting tube and then installed in a power plant, a large-scaled refrigeration system, an LNG storage, a steel foundry, and so on, so as to indicate the temperature of an associated industrial apparatus. Because the industrial apparatus shows its operation state through the temperature indicated to the outside, the thermometer mounted on the associated industrial apparatus must exactly measure and indicate the temperature of the industrial apparatus. However, since the industrial thermometer and the thermometer protecting tube may get a thermal shock by a structure of the industrial apparatus, they cannot exactly measure the temperature of the industrial apparatus due to malfunction of sensor elements. Therefore, the industrial thermometer mounted on the industrial apparatus must be frequently inspected.

In order to inspect the industrial thermometer, a structure on which the industrial thermometer is mounted is removed from the associated industrial apparatus, moved into a laboratory, and inspected in the laboratory. However, the industrial apparatus must be in a non-operation state while the industrial thermometer is inspected. So, there may occur an economical loss since the associated industrial apparatus is in an inactivated state during the inspection of the industrial thermometer. Furthermore, because a manufacturer has a tendency to delay periodical inspection of the industrial thermometer in order not to suffer from a loss generated while the associated industrial apparatus is in a non-operation state, the associated industrial apparatus may produce bad products or inflict an injury on workers who work using the industrial apparatus.

SUMMARY OF THE INVENTION

Accordingly, the present invention has been made in view of the above problems occurring in the prior art.

The main object of the present invention is to provide a fixed-point cell for connection with a thermometer protecting tube and an apparatus for estimating the lifetime of the thermometer using the same, which can compare the temperature in a constant-temperature area where a high-purity metallic material coexists in a two-phase or three-phase state with the measured temperature of an associated industrial thermometer to estimate the lifetime of the associated thermometer.

The another object of the present invention is to provide a fixed-point cell for connection with a thermometer protecting tube and an apparatus for estimating the lifetime of the thermometer using the same, which can inspect the thermometer in the corresponding site where the thermometer is used by providing a test heating device for inducing a phase change of a high-purity metallic material of the fixed-point cell.

In order to achieve the objects of the present invention, in one aspect, there is to provide a fixed-point cell for connection with a thermometer protecting tube including: a reference temperature material layer made of high-purity metallic materials to indicate a reference temperature based on a phase change of material which coexists in a two-phase or three-phase state; a container part of a multiple structure having the reference temperature material layer embedded and sealed therein for achieving thermal correlation between the reference temperature material layer and a thermometer protecting tube having a thermometer contained therein, the thermometer protecting tube being inserted into the central hole of the fixed-point cell while being in contact with the inner circumference of the container part; and fixing means disposed on the top portion of the container part for fixing the thermometer protecting tube to the container part in a fastening manner.

It is preferable that the reference temperature material layer is made of a single metallic material.

It is preferable that the reference temperature material layer is made of alloy.

It is preferable that the container part includes: a first container being of a double structure of a inner casing and a outer casing extending along an axial line from a upper portion to a lower portion, the first container being opened at one side for receiving the thermometer protecting tube and closed at the other side, the first container being in a vacuum condition between the inner and outer casing of the first container; and a second container embedded in the first container and having the reference temperature material layer contained therein.

It is preferable that the fixing means includes: a first flange coupled to the opened side of the first container along the coaxial line and facing with the outer circumferential surface of the thermometer protecting tube; and a second flange being in inclinedly close contact with the upper portion of the first flange and coupled with the first flange, wherein the second flange is pressing and fixing the thermometer protecting tube when the second flange forces the first flange to press toward the center of the axial line.

In another aspect of the present invention, there is also provided an apparatus for estimating the lifetime of a thermometer, including: a fixed-point cell receiving and contacting with a thermometer protecting tube, the thermometer protecting tube having the thermometer built therein, the fixed-point cell having a reference temperature material layer made of a high-purity metallic material contained therein to achieve thermal correlation between the thermometer protecting tube and the fixed-point cell and indicate a reference temperature based on a phase change of the material which coexists in a two-phase or three-phase state; a heating device for receiving the fixed-point cell therein and heating the fixed-point cell to induce a phase change of the reference temperature material layer; a temperature indicator grounded to a lead wire of the thermometer to indicate the temperature of the reference temperature material layer measured by the thermometer; and a computer for comparing a difference between the reference temperature in a constant-temperature area formed by the phase change and the measured temperature of the thermometer with a reference deviation, and storing the reference temperature in the constant-temperature areas and the reference deviation to determine an error of the thermometer according to an abnormal range of the reference deviation, the computer being electrically connected with the temperature indicator, wherein the fixed-point cell includes: a container part of a multiple structure having the reference temperature material layer embedded and sealed therein for achieving thermal correlation between the reference temperature material layer and a thermometer protecting tube having a thermometer built therein; and fixing means disposed on the top portion of the container part for fixing the thermometer protecting tube to the container part in a fastening manner.

It is preferable that the fixing means includes: a first flange coupled to the opened side of the first container along the coaxial line and facing with the outer circumferential surface of the thermometer protecting tube; and a second flange being in inclinedly close contact with the upper portion of the first flange and coupled with the first flange, the second flange pressing and fixing the thermometer protecting tube when the second flange forces the first flange to press toward the center of the axial line.

BRIEF DESCRIPTION OF THE DRAWINGS

The objects, features and other advantages of the present invention will be apparent from the following detailed description of the preferred embodiments of the invention in conjunction with the accompanying drawings, in which.

DETAILED DESCRIPTION

Reference will now be made in detail to the preferred embodiments of the present invention, examples of which are illustrated in the accompanying drawings.

Figure 1:
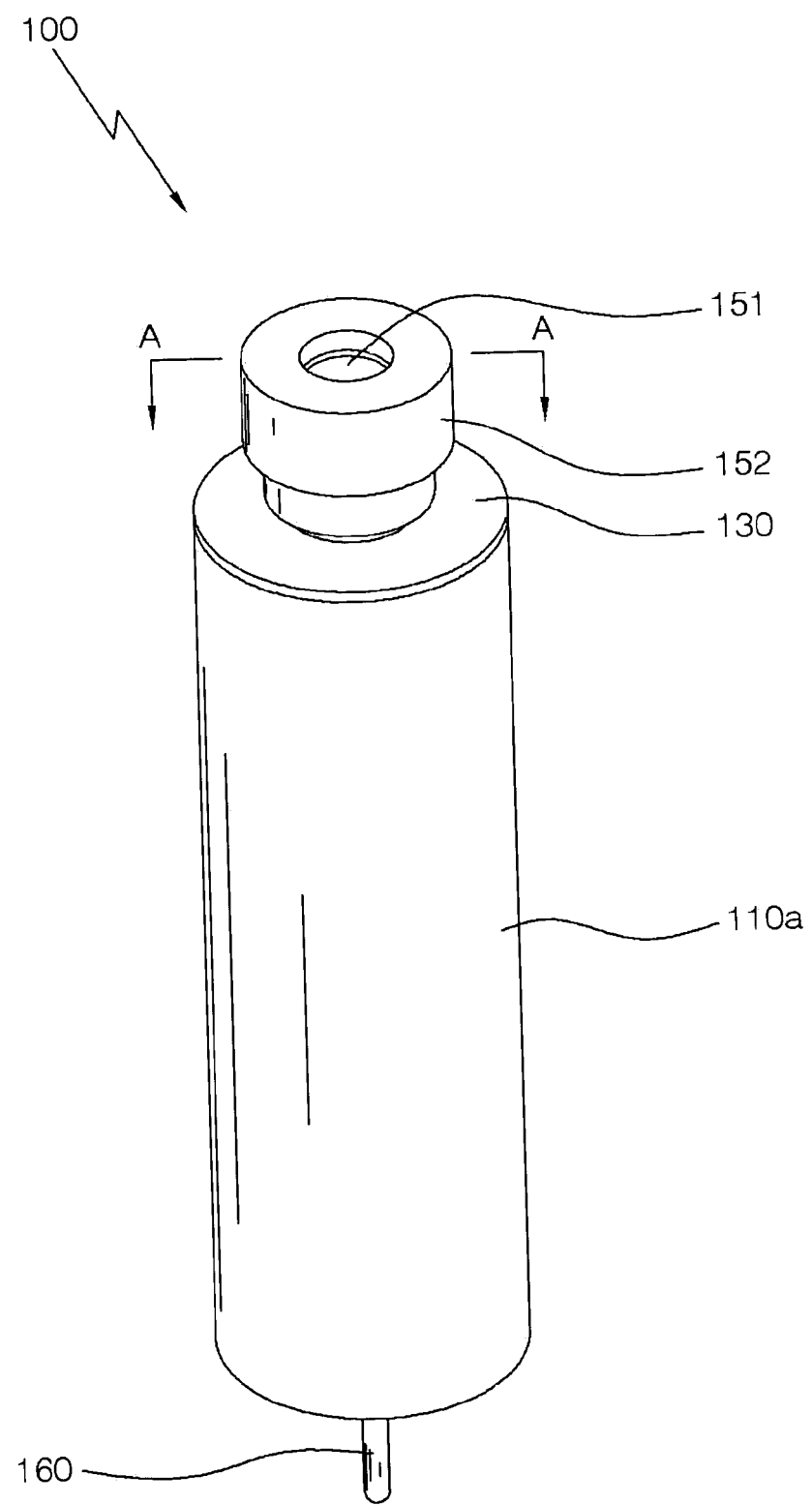
FIG. 1 is a perspective view of a fixed-point cell for connection with a thermometer protecting tube according to a preferred embodiment of the present invention.
Figure 2:
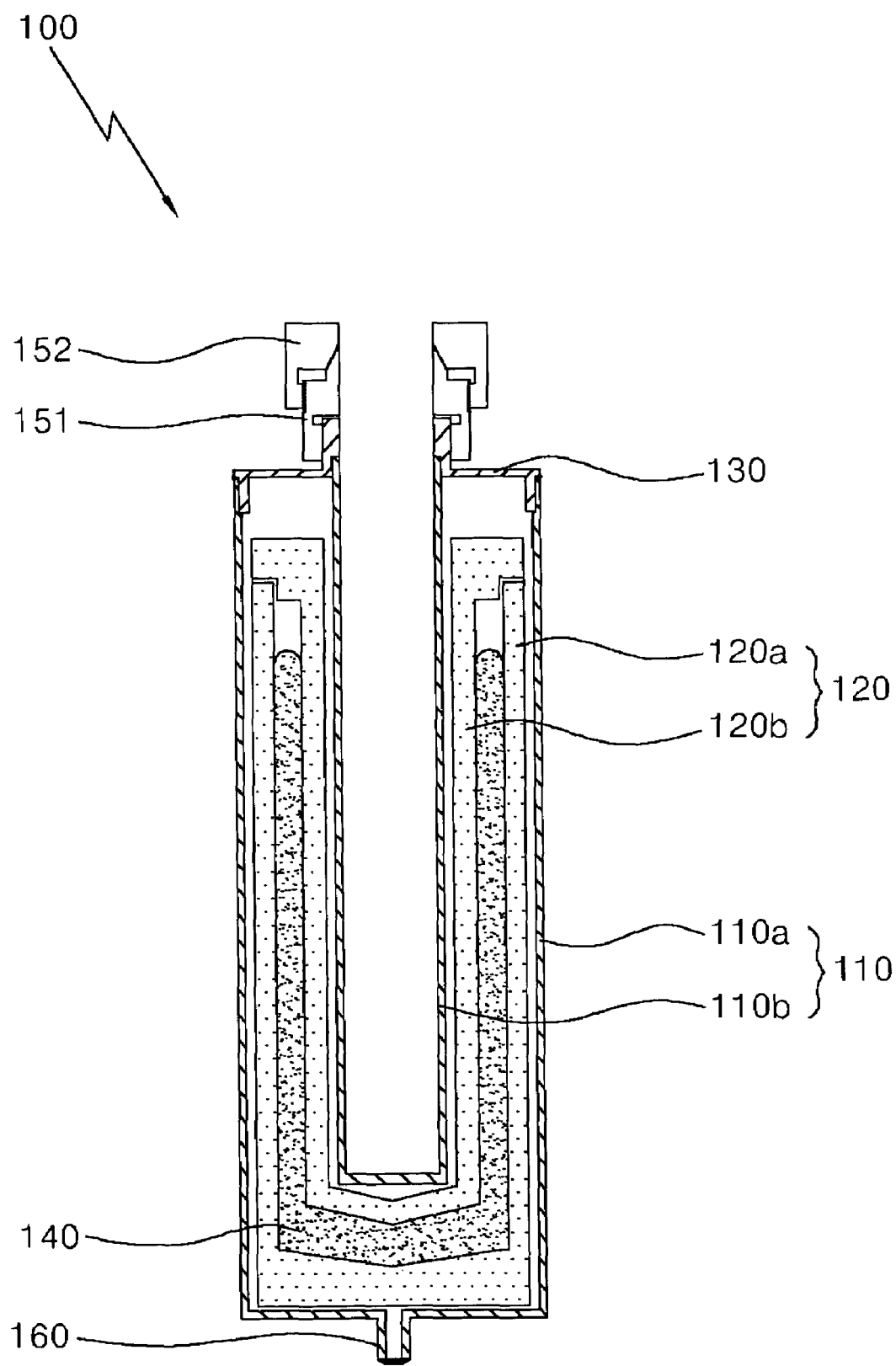
FIG. 2 is a sectional view taken along the line of A—A of FIG. 1.
Figure 3:
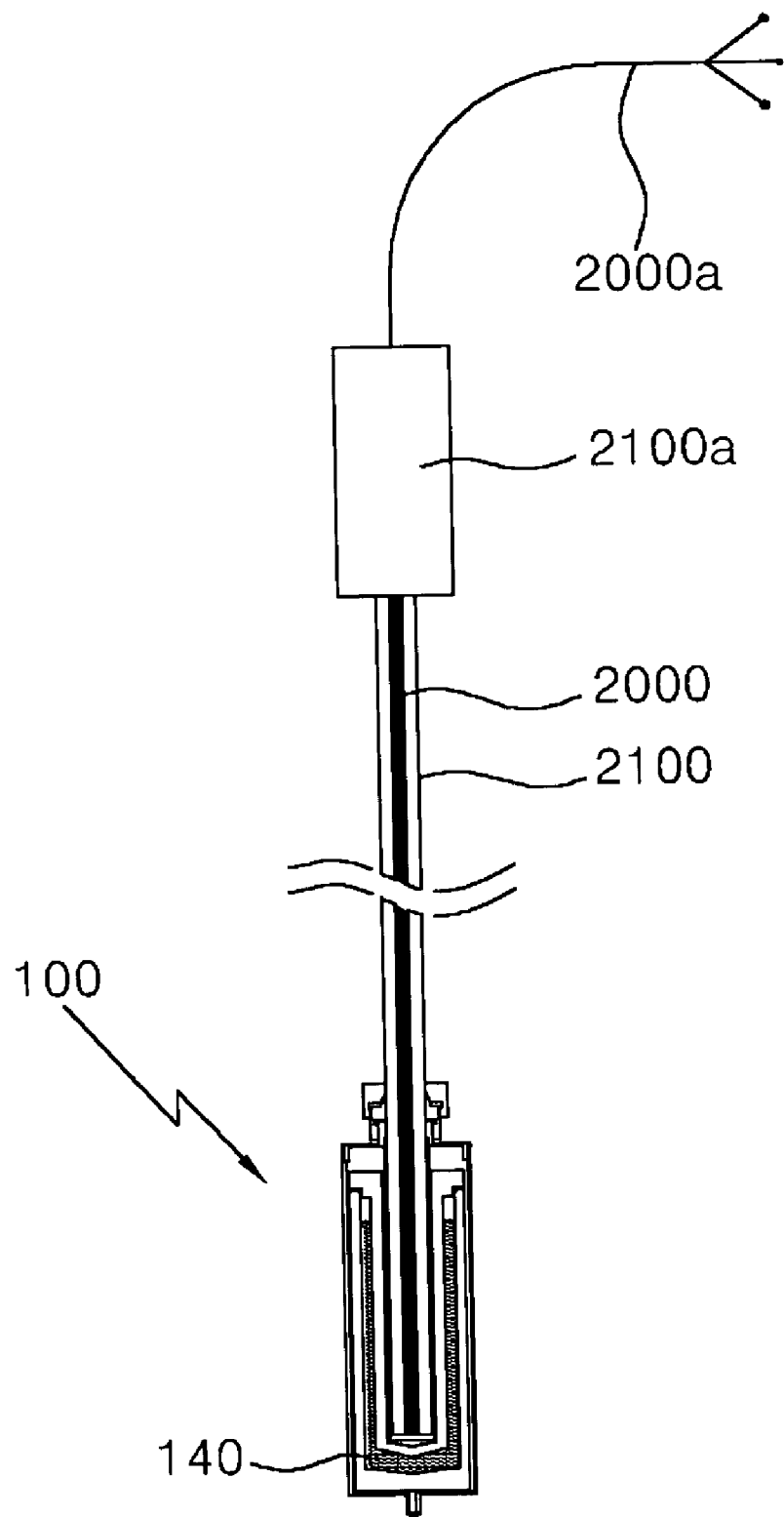
FIG. 3 is a detailed structural view showing a used state of the fixed-point cell of FIG. 1.

FIG. 1 is a perspective view of a fixed-point cell for connection with a thermometer protecting tube according to a preferred embodiment of the present invention, FIG. 2 is a sectional view taken along the line of A—A of FIG. 1, and FIG. 3 is a detailed structural view showing a used state of the fixed-point cell of FIG. 1.

As shown in FIGS. 1 and 2, the fixed-point cell 100 for connection with a thermometer protecting tube according to the present invention includes a reference temperature material layer 140 for indicating the reference temperature based on a phase change within a container part of a multiple-container structure. When the thermometer protecting tube 2100 is inserted into the container part, heat is transferred from the reference temperature material layer 140 to a thermometer 2000 mounted in the thermometer protecting tube 2100, and then, the measured temperature indicated by the thermometer 2000 is compared with inherent reference temperature of the corresponding phase-changed state, for example, a constant-temperature state where two phases or three phases coexist, so that an error range of the thermometer 2000 can be measured.

The fixed-point cell 100 includes the container part and the reference temperature material layer 140 contained in the container part. The container part includes: a first container 110 made of stainless steel to prevent rust; and a second container 120 embedded in the first container 110, wherein the second container 120 is made of alumina having corrosion resistance and heat resistance or high-purity carbon (or graphite) for protecting the reference temperature material layer 140.

The first container 110 is a double-container structure, and includes a first outer casing 110a located relatively outside and a first inner casing 110b located relatively inside. The first outer and inner casings 110a and 110b are all in the form of a cylinder opened at the upper portion and closed at the lower portion. The first inner casing 110b is arranged at a predetermined interval from the first outer casing 110a as being relatively smaller diameter and length than the first outer casing 110a.

A cover 130 is mounted on the top portion of the first container 110, and forcedly fit between the first outer casing 110a and the first inner casing 110b, and a contact portion between the cover 130 and the first container 110 is welded and sealed. It is preferable that the inside of the first container 110 is in a vacuum state to prevent reaction between the reference temperature material layer 140 and oxygen. For this, the first container 110 has a hole formed in the center of the lower end thereof. The air is discharged to the outside through the hole, and then, a tube 160 located in the hole on the lower portion of the first container 110 is stopped and welded.

The second container 120 is contained between the first outer casing 110a and the first inner casing 110b of the first container 110. The second container 120 includes a second outer casing 120a and a second inner casing 120b, wherein the second inner casing 120b is smaller diameter and length than the second outer casing 120a. The reference temperature material layer 140 is contained in the second container 120.

Therefore, the reference temperature material layer 140 is embedded between the second outer casing 120a and the second inner casing 120b of the second container 120, and the reference temperature material layer 140 is located between the first outer casing 110a and the first inner casing 110b of the first container 110 of the vacuum state.

The reference temperature material layer 140 is made of a metallic material such as tin, aluminum, zinc, silver and so on, and it is well known that the above metallic materials are used as reference temperature materials for international temperature standard. However, the above metallic materials can be alloyed when various kinds of thermometers 2000 are inspected according to a measured temperature range in the corresponding apparatus (for example, a power plant, a steel foundry, a refrigeration system, and so on) using one fixed-point cell 100.

To insert and fix the thermometer protecting tube 2100 of the thermometer 2000 which is inspected, into the fixed-point cell 100, the container part has fixing means mounted on the upper end thereof. The fixing means includes a first flange 151 and a second flange 152, which are coupled with each other, and contacted surfaces formed between the flanges 151 and 152 are inclined. Therefore, the fixing means compresses and fixes the thermometer protecting tube 210 inserted into the first inner casing 110b of the first container 110 while moving along the inclined surface.

At this time, the first flange 151 is coupled and fixed to the outer circumferential surface of the upper portion of the cover 130, and the second flange 152 is coupled to the outer circumferential surface of the first flange 151 and is in close contact with the inclined surface of the first flange 151.

The inclined surfaces of the first and second flanges 151 and 152 are inclined toward a central axis of the first inner casing 110b. Therefore, when the second flange 152 is rotated in such a manner as to ascend along the inclined surface, the inclined surface of the second flange 152 presses the inclined surface of the first flange 151, and thereby the fixing means is inclined to the inside (central axis) of the first inner casing 110b. At this time, the outer circumferential surface of the thermometer protecting tube 2100 inserted into the first inner casing 110b is pressed by the inside portion of the inclined surface of the first flange 151, and thereby, the thermometer protecting tube 2100 can be firmly fixed to the fixed-point cell 100.

By the above process, the thermometer protecting tube 2100, in which the thermometer 2000 is mounted, and the fixed-point cell 100 are coupled with each other, and the reference temperature material layer 140 of the fixed-point cell 100 has a thermal correlation with the thermometer 2000. As a result, the present invention can compare the reference temperature and the measured temperature of the thermometer 2000 during the phase change (when two-phase and tree-phase coexist) without any loss of heat of the reference temperature material layer 140, which has been heated and changed in phase.

As shown in FIG. 3, the fixed-point cell 100 is connected with the thermometer protecting tube 2100, when the lower portion of the thermometer protecting tube 2100 is inserted into the inner circumference of the first inner casing 110b of the first container 110, the second flange 152 is tightened, and the outer circumferential surface of the thermometer protecting tube 2100 is forcedly fixed to the first flange 151.

For example, a Pt-resistance thermometer is commonly used as the industrial thermometer 2000. The Pt-resistance thermometer 200 is connected with a lead wire 2000a, and shows temperature based on signal of the lead wire 2000a.

The lead wire 2000a is mounted on the upper end of the thermometer protecting tube 2100, and a temperature indicator 300 is grounded on the lead wire 2000a to indicate the temperature of of the reference temperature material layer measured by the thermometer on the basis of the signal of the lead wire 2000a.

The thermometer protecting tube 2100 has a grip 2100a mounted at the upper portion thereof for allowing a worker to grasp the grip 2100a with the hand. When the worker who grasps the grip 2100a inserts the lower portion of the thermometer protecting tube 2100 into the first inner casing 110b of the first container 110 and turns the second flange 152, the inner surface of the first flange 151 presses and fixes the outer circumferential surface of the thermometer protecting tube 2100, so that the fixed-point cell 100 and the thermometer protecting tube 2100 are connected with each other.

Figure 4:
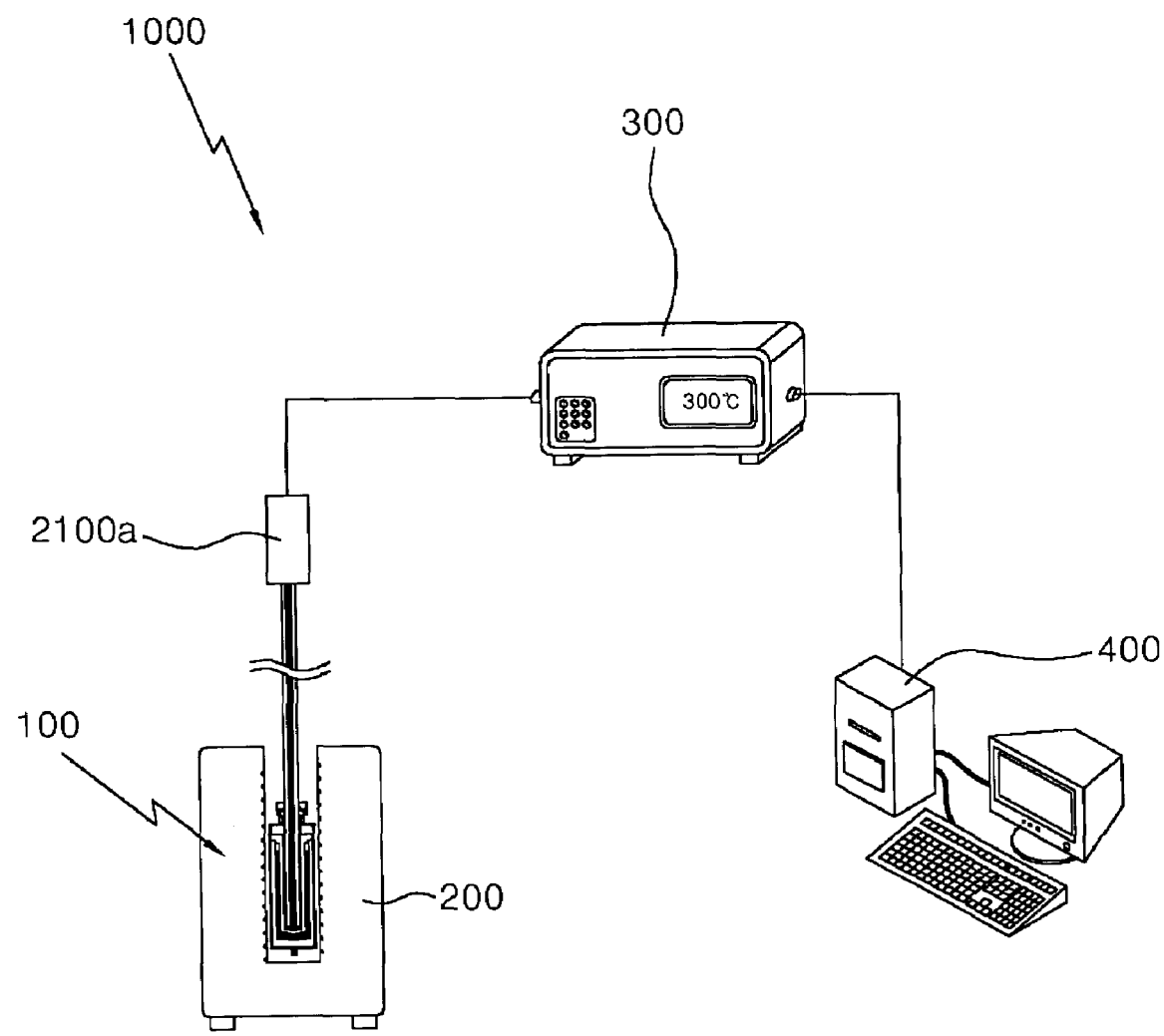
FIG. 4 is a structural view of an apparatus for estimating the lifetime of a thermometer using the fixed-point cell for connection with the thermometer protecting tube according to the present invention.

FIG. 4 is a structural view of an apparatus for estimating he lifetime of a thermometer using the fixed-point cell for connection with the thermometer protecting tube according to the present invention.

The thermometer protecting tube 2100 contains the Pt-resistance thermometer 2000 therein, and is connected with the fixed-point cell 100, so that there occurs heat transfer between the reference temperature material layer 140 of the fixed-point cell 100 and the Pt-resistance thermometer 2000 of the thermometer protecting tube 2100.

An estimating apparatus 1000 according to the present invention includes: the fixed-point cell 100 for connection with the thermometer protecting tube 2100; a heating device 200 for receiving the fixed-point cell therein and heating the fixed-point cell 100 to induce a phase change of the reference temperature material layer 140; and a computer 400 for comparing the reference temperature of the reference temperature material layer 140 and the measured temperature of the thermometer 2000 with reference deviation, and judging an error.

The lead wire 2000a of the thermometer 2000 is grounded with the temperature indicator 300. Therefore, the measured temperature is indicated by the temperature indicator 300. The temperature indicator 300 is electrically connected with the computer 400, and thereby, the indicated temperature, namely, the measured temperature is inputted in the computer 400.

The computer 400 stores composition of the reference temperature material layer 140 and the temperature of phase change of the corresponding metallic materials therein. Moreover, the computer 400 also stores the reference deviation therein for comparing with the difference between the reference temperature and the measured temperature, and thereby the computer 400 is used for estimation of the lifetime of the thermometer 2000.

In the drawing, the heating device 200 has an electric furnace using a heating wire. The heating device 200 has a space therein for inserting the fixed-point cell 100 connected with the thermometer protecting tube 2100 which will be inspected. It is preferable that the heating device 200 is small-sized for easy carrying and movement inside the corresponding site and has a manipulation panel structure. The fixed-point cell 100 inserted into the heating device 200 is heated by the heating device 200, and then, the reference temperature material layer 140 of the fixed-point cell 100 is also heated and changed in phase. In the phase change, an area where two phases or three phases coexist is a constant-temperature area, and temperature of the constant-temperature area is set as the reference temperature.

Hereinafter, a process of estimating the lifetime of the thermometer in the case where the reference temperature material layer 140 is made of tin (Sn) will be described. At this time, the two-phase area where a solid state and a liquid state coexist is set as the reference constant temperature area.

The melting temperature of tin is about 232° C. In the temperature, the two-phase state where tin of a solid state and tin of a liquid state coexist, i.e., a constant-temperature state, can be continued for a predetermined time period.

First, the heating device 200 is moved to the corresponding site, and the thermometer 2000 and the thermometer protecting tube 2100 removed from the corresponding structure (for example, a casting furnace) are connected with the fixed point cell 100. Next, the fixed-point cell 100 connected with the thermometer 2000 and the thermometer protecting tube 2100 is inserted into the heating device 200, and then, heated slowly.

If the heating is continued over the melting temperature of tin, the two-phase state of solid and liquid, i.e., the constant temperature state can be achieved. Then, heat is transferred from the reference temperature material layer 140 to the thermometer protecting tube 2100 and the thermometer 2000.

After that, the temperature indicator 300 grounded to the lead wire 2000a of the thermometer 2000 indicates the measured temperature of the thermometer 2000 in numerical value. For example, if the measured temperature is about 260° C., there is an error range of 28° C. in comparison with the temperature of the two-phase state of solid and liquid of tin, i.e., the reference temperature of about 232° C.

Data of the measured temperature indicated by the temperature indicator 300 is transferred to the computer 400.

The computer 400 computes the error range and compares it with the reference deviation. If the reference deviation is 20° C., as the computed error range is out of the reference deviation, the inspected thermometer 2000 is judged as a bad thermometer.

If the error range is within the reference deviation, the lifetime of the thermometer 2000 can be estimated on the basis of a used period of the thermometer 2000 and the error range.

As described above, in the fixed-point cell for connection with the thermometer protecting tube and the apparatus 1000 for estimating the lifetime of the thermometer using the fixed-point cell according to the present invention, the inspection process of the thermometer 2000 is described using the reference temperature material layer 140 made of tin, but it would be appreciated that the reference temperature material layer 140 can be made of one or more metallic materials, which are used as the international temperature standard, such as tin, zinc, aluminum, silver and so on.

Furthermore, in the present invention, the temperature of the two-phase area of solid and liquid is set as the temperature of the constant-temperature area, but it would be appreciated that temperature of a three-phase area where the solid state, the liquid state, and a gas state coexist together can be set as the reference temperature of the constant-temperature area. The phase state can be varied according to the temperature range during the process where the inspected thermometer 2000 is used.

Moreover, in the present invention, the tube 160 located at the lower portion of the first outer casing 110b of the first container 110 is welded and sealed, but it would be appreciated that the tube 160 is sealed by a sealing body. In addition, it is possible that stabilized and inert gas is injected into the first container 110, not in the vacuum state of the first container 110.

As described above, the fixed-point cell for connection with the thermometer protecting tube and the apparatus 1000 for estimating the lifetime of the thermometer using the fixed-point cell according to the present invention can conveniently inspect an error of the thermometer mounted in the corresponding site.

Since a producing process is not stopped for a long time if the present invention is used, the present invention can reduce an error rate of products and increase production efficiency as allowing a periodical inspection without prevention of production progress.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A fixed-point cell for connection with a thermometer protecting tube comprising:
   a reference temperature material layer made of high-purity metallic materials to indicate a reference temperature based on a phase change of material which coexists in a two-phase or three-phase state;
   a container part of a multiple structure having the reference temperature material layer embedded and sealed therein for achieving thermal correlation between the reference temperature material layer and a thermometer protecting tube having a thermometer built therein, the thermometer protecting tube being inserted into the container part while being in contact with the inner circumference of the container part; and
   fixing means disposed on the top portion of the container part for fixing the thermometer protecting tube to the container part in a fastening manner,
   wherein the container part includes:
      a first container opened at one side to receive the thermometer protecting tube and closed at the other side, the first container being of a double structure of an inner casing and an outer casing extending along an axial line from an upper portion to a lower portion; and
      a second container embedded in the first container and having the reference temperature material layer contained therein,
   wherein the fixing means includes:
      a first flange coupled to the opened side of the first container along the coaxial line and facing with the outer circumferential surface of the thermometer protecting tube; and
      a second flange being in inclinedly close contact with the upper portion of the first flange and coupled with the first flange, wherein the second flange is pressing and fixing the thermometer protecting tube when the second flange forces the first flange to press toward the center of the axial line.

2. The fixed-point cell according to claim 1, wherein the reference temperature material layer is made of a single metallic material.

3. The fixed-point cell according to claim 1, wherein the reference temperature material layer is made of alloy.

4. An apparatus for estimating the lifetime of a thermometer comprising:
   a fixed-point cell, to which a thermometer protecting tube is inserted and with which the thermometer protecting tube is in contact, the thermometer protecting tube having the thermometer built therein, the fixed-point cell having a reference temperature material layer made of a high-purity metallic material contained therein to achieve thermal correlation between the thermometer protecting tube and the fixed-point cell and indicate a reference temperature based on a phase change of the material which coexists in a two-phase or three-phase state;
   a heating device receiving and coupled with the fixed-point cell and heating the fixed-point cell to induce the phase change of the reference temperature material layer;
   a heating device receiving and coupled with the fixed-point cell and heating the fixed-point cell to induce the phase change of the reference temperature material layer;
   a temperature indicator grounded to a lead wire of the thermometer to indicate the temperature of the reference temperature material layer measured by the thermometer; and
   a computer for comparing a difference between the reference temperature in a constant-temperature area formed by the phase change and the measured temperature of the thermometer with a reference deviation, and storing the reference temperature in constant-temperature areas and the reference deviation to determine an error of the thermometer according to an abnormal range of the reference deviation, the computer being electrically connected with the temperature indicator, wherein the fixed-point cell includes:

a container part of a multiple structure having the reference temperature material layer embedded and sealed therein for achieving thermal correlation between the reference temperature material layer and a thermometer protecting tube having a thermometer built therein; and fixing means disposed on the top portion of the container part for fixing the thermometer protecting tube to the container part in a fastening manner whereby the computer can estimate the lifetime of the thermometer by calculating difference between the measured temperature and the reference temperature and comparing the value of the difference with a used period and with an error range.

5. The apparatus for estimating the lifetime of the thermometer according to claim 4, wherein the reference temperature material layer is made of a single metallic material.

6. The apparatus for estimating the lifetime of the thermometer according to claim 4, wherein the reference temperature material layer is made of alloy.

7. The apparatus for estimating the lifetime of the thermometer according to claim 4, wherein the container part:

a first container opened at one side to receive the thermometer protecting tube and closed at the other side, the first container being of a double structure extending along an axial line from the upper portion to the lower portion; and a second container embedded in the first container and having the reference temperature material layer contained therein.

8. The apparatus for estimating the lifetime of the thermometer according to claim 7, wherein the fixing means includes:

a first flange coupled to the opened side of the first container along the coaxial line and facing with the outer circumferential surface of the thermometer protecting tube; and a second flange being in inclinedly close contact with the upper portion of the first flange and coupled with the first flange, the second flange pressing and fixing the thermometer protecting tube when the second flange forces the first flange to press toward the center of the axial line.

* * * * *